July 16, 1935.  G. B. SCHEIBELL  2,008,110
REVERSIBLE MAGAZINE CAMERA
Filed April 14, 1933
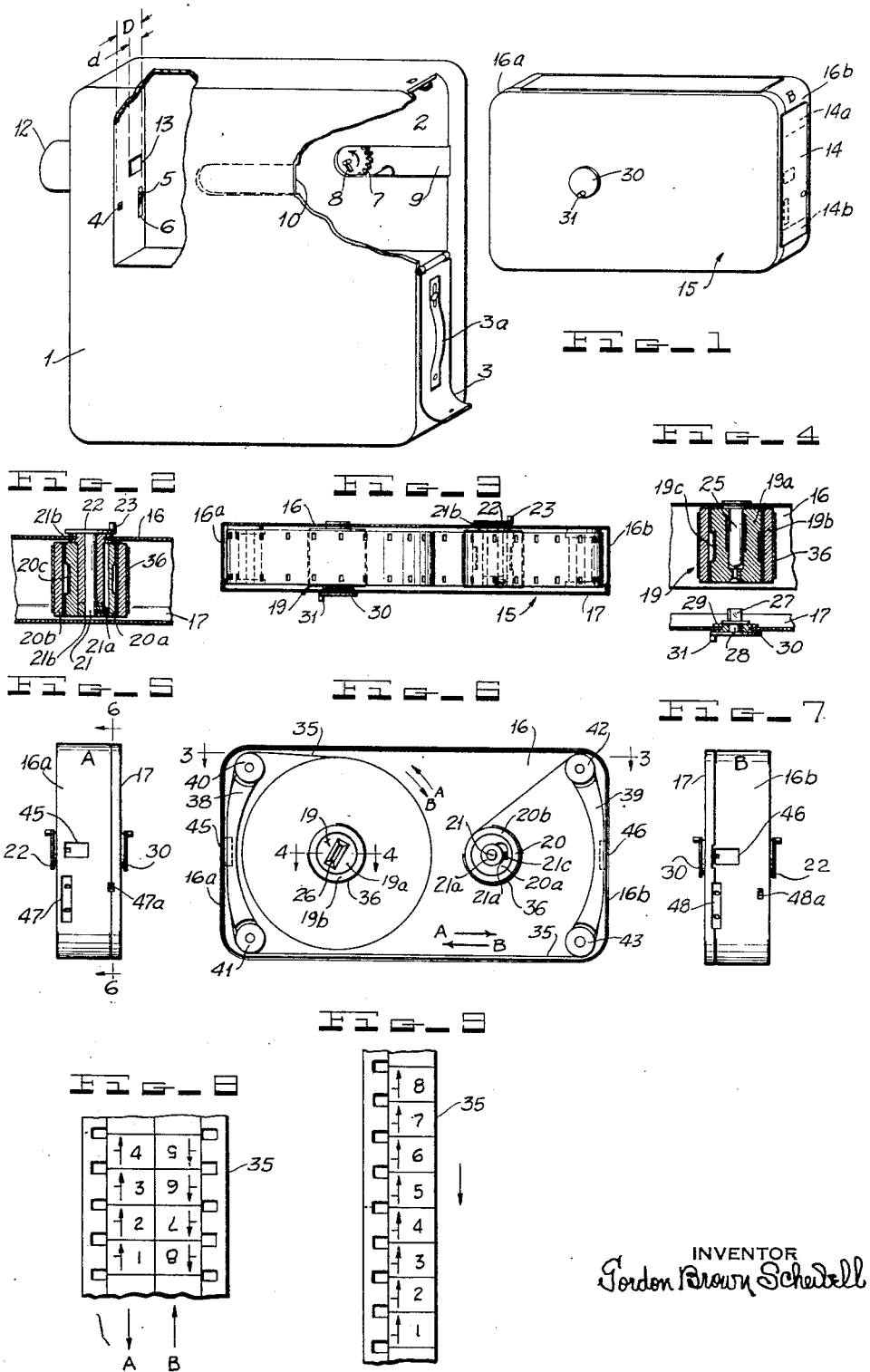
INVENTOR
Gordon Brown Scheibell Patented July 16, 1935

2,008,110

UNITED STATES PATENT OFFICE 2,008,110

REVERSIBLE MAGAZINE CAMERA

Gordon Brown Scheibell, New York, N. Y.

Application April 14, 1933, Serial No. 666,094

8 Claims. (Cl. 88—16)

REISSUED

APR 2 3 1940

My invention pertains in general to film apparatus and specifically relates to apparatus for reversibly feeding a film in a recording process.

One of the objects of my invention consists in providing a camera of the magazine loading type for producing a film having a plurality of adjacent longitudinal records thereon.

Another object comprises providing a construction of film apparatus including a film magazine adapted to be utilized in a plurality of recording positions with reference to an optical system.

Another object consists in producing film apparatus employing a magazine for supporting and reversibly feeding a film.

These and other objects will be apparent from the following, reference being had to the accompanying drawing in which like reference numerals designate corresponding parts throughout and in which;

Fig. 1 is a perspective view of one embodiment of the camera and film magazine of my invention showing parts of the camera broken away to illustrate the interior of the magazine compartment;

Fig. 2 is an enlarged sectional view of one of the reels in the film magazine employed in my invention;

Fig. 3 is a horizontal sectional view of the film magazine constructed according to my invention;

Fig. 4 is an enlarged sectional view of a portion of the film magazine of Fig. 3 with the cover detached therefrom illustrating the construction of another of the reels and the arrangement for imparting rotary motion to this reel in the film magazine;

Fig. 5 is an end elevation corresponding to the view of the film magazine shown in section in Fig. 6;

Fig. 6 is a vertical sectional view of the film magazine of my invention showing the interior arrangement of film suporting and feeding mechanism;

Fig. 7 is an elevation of an end of the film magazine opposite from that shown in Fig. 5;

Fig. 8 is a portion of film exposed in accordance with the principles of my invention and schematically representing dual series of images recorded thereon; and Fig. 9 is a view of the film of Fig. 8 divided and joined to form a composite record having a single series of recorded images.

My invention contemplates the provision of a camera and film magazine for producing a film record comprising two series of images recorded upon adjacent longitudinal portions of the film and inverted with respect to each other. Upon development, such a film may be longitudinally divided and the divided portions joined end to end to form a single record of images in the proper order and with the perforations of the film all on one side. Such a film has many advantages, particularly in features of economy and compactness of camera mechanism.

Referring to the drawing in detail, and particularly to Fig. 1, the camera structure 1 comprises a housing including a compartment 2 and a hinged closure member 3. The closure member 3 is provided with a spring 3a for retaining purposes as hereinafter pointed out. The structure 1 includes spring driven mechanism known in the art for imparting intermittent reciprocative movement to a claw member 5 movable in a slot 6 within the front end of compartment 2. A pilot pin 4 is also provided and driven by the camera mechanism for ensuring the complete stoppage of the film while a picture is being taken. The driving mechanism within camera 1 also includes means for rotating a spur gear 7 upon which a small fin 8 is mounted. The gear 7 and fin 8 are accessible to the compartment 2 through a slot 9 in the camera structure 1. Upon the opposite side of the compartment 2 is another slot 10 in the form of a recess in the side wall of compartment 2 and extending longitudinally further into the compartment. The gear 7 and fin 8 are for the purpose of imparting rotary motion to reel mechanism contained in a film magazine which may be inserted in the compartment 2. It will be understood that certain mechanism internal of the camera structure 1 is of the usual form found in cameras of the general type indicated and for that reason is omitted in detail from the drawing in order to avoid confusion. Departure from the prior art in accordance with the principles of my invention is clearly indicated.

In accordance with my invention, a stationary optical system including a lens tube 12 as well as an aperture 13 are provided in the camera structure 1 for focusing an image upon a film which may be held by a magazine within the compartment 2. This optical system and aperture are especially proportioned for producing an image slightly less than half the width of the recording film. This may be seen from Fig. 1 in which the width of the film is represented by "D" and the width of the image with respect thereto is approximately represented by "d". A suitable shutter is provided in the camera intermediate the aperture and lens tube and is driven by the camera mechanism in a well known manner.

A film magazine 15 is shown in Fig. 1 in position for insertion in the compartment 2. Referring to Figs. 3 and 6, the film magazine 15 comprises a casing including a container 16 and cover lid 17. The container 16 includes end walls 16a and 16b which are engraved with indicia in the form of the designations "A" and "B" to assist the operator in the proper use of the magazine in a reversal recording process. Reels 19 and 20 are provided within the container 16. It will be understood, in this specification, that the term "reel" is used to denote any kind of rotatable device upon which film may be stored.

The reel member 19 is mounted as shown in greater detail in Fig. 4. It will be seen that the reel member 19 comprises two concentric collars 19a and 19b. The inner collar 19a is rotatably and removably fitted upon a spindle post 25 secured to one side of the container 16. This inner collar 19a is provided with an exterior annular channel in which an expanding spring 19c is positioned. This spring 19c is positively secured to the inner collar 19a and exerts pressure against the outer collar 19b and forms, in effect, a friction clutch which permits the speed of rotation of the outer collar 19b to be retarded, due to an increasing accumulation of film on reel 19, without retarding the driving speed of rotation of the inner collar 19a. The reel 19 has a slot 26 for receiving a key member 27. The key member 27 is secured to a stub-spindle 28 rotatably mounted in a bushing 29 extending through the wall of the cover 17. The stub-spindle 28 terminates in a disc 30 on the outside of the cover 17. The disc 30 is provided with a pin 31 for engagement by fin 8 of spur gear 7 when the film magazine is placed within compartment 2. When the cover 17 is placed upon the container 16, the key member 27 fits into the slot 26 and rotation of disc 30 serves to impart rotary motion to the reel 19.

Referring to Figs. 2 and 6, the reel member 20 also is formed of two concentric collars 20a and 20b with an intermediate spring 20c similar to the spring 19c. The inner collar 20a has a keyway 21c engaged by a set screw 21a carried by a removable collar 21b mounted on spindle 21. The spindle 21 is rotatably mounted through a bearing 21b fixed to the wall of the container 16b. The spindle 21 terminates in a disc 22 external of the container 16. This disc 22 is provided with a pin 23 similar to pin 31 for engagement by the fin 8 when the magazine 15 is inserted in compartment 2 in the proper position. It will be apparent that both of the reels 19 and 20 are of the internal slip clutch type and that the driving gear 7 may be positively geared with the driving mechanism within the camera structure 1 thus avoiding any form of driving belts or the like.

A perforated photosensitive film 35 is initially wound upon the reel member 19 and positively secured thereto by suitable means such as a spring clip 36. In the present embodiment, this film is of the 16 millimeter type. At opposite ends of the container 16 are two film guide members 38 and 39, provided at their extremities with rollers 40, 41, 42, and 43. Referring to Fig. 5, it will be seen that an aperture 45 is provided in the end 16a of container 16 in juxtaposition with the film guide member 38. The aperture 45 is positioned on one side of the end wall 16a of the container 16 to align with the aperture 13 when the container 16 is positioned in the compartment 2 with the end 16a of container 16 facing the lens tube 12. An aperture 46 is provided in the end wall 16b of container 16. However, the aperture 46 is positioned upon the other side of the container 16 so as to align with the aperture 13 when the container 16 is placed within the compartment 2 with the end 16b facing the lens tube 12. Other apertures 47 and 48 are provided in the ends 16a and 16b, respectively, for permitting the reciprocative claw member 5 in camera structure 1 to engage with the perforations in film 35 for intermittently moving the film past the apertures 45 and 46. Apertures 47a and 48a are also provided, as shown, in the end-walls 16a and 16b, respectively, for aligning with the pilot-pin 4 when magazine 15 is inserted in compartment 2, thereby permitting the pilot pin to intermittently engage with the perforations of the film 35 as the same is moved within the magazine.

It will be seen in Fig. 6 that the film 35 is threaded from reel member 19 between guide member 38 and end wall 16a of the housing 16 and thence between guide member 39 and end wall 16b of container 16. The film then is fed to reel element 20, being positively secured thereto by suitable means such as a spring clip. Each of the guide members 38 and 39 is provided with a suitable tension plate for pressing the film against the apertures 45 and 46, respectively. Any form of film guiding or tension members, in addition to those shown, may be employed within the magazine 15 as desired.

In the use of the reversible magazine camera of my invention, the magazine 15 is initially prepared by disposing the film as shown in Fig. 6. The cover 17 is placed upon the container 16 so that the key member 27 engages the slot 26 in reel member 19. Adhesive tape may then be placed upon the upper and lower sides of the magazine to hold the container 16 and cover 17 securely together. In the initial preparation of the magazine 15, a protective strip 14 is placed upon the end 16b of container 6 beneath the designation "B". This strip 14 is preferably formed of suitable flexible material and includes two end portions 14a and 14b having adhesive material thereon for attachment to the wall of the container 16. The protective strip 14 covers the apertures 46 and 48 and serves as a guide for the proper use of the magazine as will be hereinafter apparent.

As shown in Fig. 1, the magazine 15 is inserted in compartment 2 so that the aperture 45 is brought in alignment with aperture 13 and the aperture 47 is brought in alignment with slot 6. The disc 22 will be positioned within slot 9 opposite the spur gear 7 so that the fin 8 can engage with the pin 23, and the disc 30 will be positioned within slot 10 and be free to rotate therein. The closure member 3 may then be snapped into position whereby the compartment 2 is rendered light-tight and the spring 3a, mounted upon the closure member 3, presses against the film magazine 15 so that engagement of the member 5 with the perforated film 35 is insured. The camera is then in condition for making a series of photographic records.

The driving mechanism within the camera structure 1 may be released in the usual manner so that the member 5 longitudinally moves the film 35 in the direction indicated by arrows "A" in Fig. 6. At the same time, the spur gear 7 is rotated by the driving mechanism so that the fin 8 engages with pin 23 and causes reel member 20 to revolve, thereby taking up the film positively driven by the member 5. As this procedure is followed, the lens 12 directs light through aperture 13 and aperture 45 to produce a series of images upon the film 35 as shown in Fig. 8. Referring to Fig. 8, the film may be considered as moving in the direction indicated by arrow A whereby the images form a consecutive record schematically represented by the squares "1", "2", "3", "4", in the order of exposure. During this exposure process, it will of course be recognized that the magazine 15 may be removed, if desired, with but the loss of the film at that time in position at aperture 35. This is in accordance with usual film magazine practice and may be a desirable procedure for some purposes, such as the substitution of a more sensitive film to suit certain conditions of light or subject.

When the film has been unwound from reel member 19 and wound upon reel member 20 so that the limit of travel of the film 35 in the direction of arrow "A", in Fig. 6 has been reached, the film will cease moving since the force exerted by member 5 and driving fin 8 is insufficient to dislodge the film 35 from its positive connection with reel member 19, due to the spring clip 36. Due to the cessation of movement of the film, the operator of the camera is apprised of the fact that the film has reached its limit of travel in one direction. In lieu of this procedure, the operator may watch the usual footage indicator, provided on the camera structure 1, for indication of the limit of travel of the film in one longitudinal direction. When the limit of travel of the film has been reached, the closure member 3 is opened, and the magazine withdrawn from compartment 2. The protective strip 14 is removed from the end wall 16b of the magazine and placed in the same relative position on the end wall 16a of the magazine 15 beneath the engraved designation "A". This is easily and quickly accomplished since the adhesive portions 14a and 14b of the strip 14 render the same easily attachable to and detachable from the surface of the film magazine.

As soon as the protective strip 14 is attached to the end 16a of magazine 15, the magazine 15 is replaced within the compartment 2 but in the opposite direction with the now exposed aperture 46 in alignment with aperture 13 and aperture 48 in alignment with slot 6. The disc 22 will now register with slot 10 while the disc 30 will register with slot 9 so that the fin 8 may engage with pin 31 on disc 30. When the closure member 3 has been positioned to close the compartment 2, the camera is in condition for a further recording process. When the driving mechanism within the camera structure 1 is now released, the member 5 is moved in the same direction as before, but the film is now driven in a reverse direction with respect to the container 16 as indicated by arrows "B". The spur gear 7, rotating in the same direction as before, now engages with pin 31 so that the reel member 19 is rotated to withdraw the film from reel member 20. In the reversal operation the lens 12 focuses the image through aperture 46 upon the other longitudinal portion of the film to make a series of pictures inverted with respect to the previously made series as shown in Fig. 8. In this reversal process, the film in Fig. 8 may be considered as travelling in the direction of arrow "B" to make the inverted series of images "5", "6", "7", and "8" in the order of exposure. When the film has been exhausted in the reversed direction the operator is apprised that the limit of film has been reached as before. The magazine 15 is then withdrawn from compartment 2 in order that the film may be removed from the magazine and developed.

In the development process, the film 35 is split longitudinally and joined as shown in Fig. 9. The two series of images which were previously inverted with respect to each other are now placed end to end in a single sequence so that the perforations of the film are all on one side. Upon splicing, a composite record will be produced which includes both series of images following in the order of exposure to produce a single sequence in the proper order. This composite record may then be utilized in a projector for reproduction purposes.

It will now be apparent that I have provided a novel form of reversible magazine camera possessing many advantages. The camera system of my invention possesses not only the inherent advantages of the magazine loading camera but also permits a greater number of images per foot of film as well as greatly increased economy and efficiency of operation. While I have shown a preferred form of my reversible magazine camera, it will be apparent that changes can be made therein without departing from the intended scope of my invention. I do not therefore desire to limit myself to the foregoing except as pointed out in the appended claims.

What I claim as new and original and desire to secure by Letters Patent of the United States is:

1. A camera comprising, a housing structure including a compartment for receiving and positioning a film magazine having driving projections upon both sides, said compartment including recesses upon both sides thereof for receiving said projections, and driving means in said structure and extending into one of said recesses for engaging with one of said projections on said magazine as inserted in said compartment.

2. The method of exposing a film in a plural apertured magazine in conjunction with a camera which comprises, masking one of said apertures and inserting said magazine in said camera so that a second aperture of said magazine can be used with said camera in a photographic process, and subsequently removing said magazine, unmasking said first mentioned aperture and masking said second mentioned aperture and reinserting said magazine in said camera for exposing said film through said second aperture in a photographic process.

3. The method of utilizing a film magazine in a plurality of recording positions in a camera which comprises adhesively attaching indicia means to one portion of said magazine while a second portion of said magazine is in operative juxtaposition with said camera in a photographic process, subsequently removing said indicia means from said first mentioned portion and attaching the same to said second mentioned portion of said magazine, and utilizing said first mentioned portion of said magazine in operative juxtaposition with said camera in a photographic process.

4. Film apparatus comprising, a camera structure having a compartment, a film magazine carrying a sensitized film including a casing constructed for insertion in said compartment, a plurality of film reels rotatably mounted within said casing, guide members for guiding said film with the sensitized surface adjacent opposite ends of said casing, said casing having apertures in said opposite ends for exposing the sensitized surface of said film, an optical system carried by said camera structure for directing light to a transversely restricted longitudinal portion of said film through one of said apertures when said casing is inserted in said compartment, driving means in said camera structure having a movable portion thereof accessible through one side of said compartment, and projections from said reels extending externally of said casing for selective engagement by said portion of said driving means depending upon the direction of insertion of said casing in said compartment.

5. A film magazine comprising, a casing including a container and cover, rotatable film moving mechanism within said container for reversibly feeding a film carried by said casing, an intermediary rotatable device mounted in said container for transmitting motion to said film moving mechanism for moving said film in one direction with respect to said casing, and an intermediary rotatable device mounted in said cover for transmitting motion to said film moving mechanism through said cover for moving said film in another direction, said last mentioned movable member being provided with a detachable mechanical coupling arrangement for coupling with said film moving mechanism when said cover is in closed position with respect to said container.

6. Film apparatus for reversibly feeding and exposing a film, comprising, a camera structure having a compartment, optical means carried by said camera for projecting into said compartment an image of an illuminated object external of said compartment, motion imparting means carried by said camera and having movable parts accessible in said compartment, said parts including perforation engaging means disposed along one side of said compartment for effecting intermittent motion and take-up drive means disposed in another side of said compartment and magazine means for carrying a sensitized film and having a pair of drivable film take-up devices rotatably mounted transversely of said magazine with movable parts thereof respectively projecting from opposite sides of said magazine, said magazine and said compartment being cooperatively constructed to permit the slidable movement of said magazine in said compartment in either of two positions, inverted with respect to each other, in a direction substantially perpendicular to the axes of rotation of said take-up devices for effecting a feeding and exposure process of the film carried by said magazine means in two different senses depending upon the position of said magazine in said compartment.

7. Film apparatus for reversibly feeding and exposing a film comprising, a camera structure having a compartment, optical means carried by said structure for projecting into said compartment an image of an illuminated object external of said compartment, motion imparting means carried by said camera and having parts thereof including an intermittent-motion perforation engaging means and a continuously rotatable element accessible in said compartment, a magazine casing insertable in said compartment in different positions and including a first and second reel element between which a sensitized film may be stored and reversibly fed, rotatable elements extending respectively from said reel elements and projecting externally of said casing for selectively imparting motion to said reel elements in effecting a take-up operation of said film, said casing structure being insertable in said compartment in two different positions and constructed, in one position, to bring a transversely restricted longitudinal portion of said film into the field of said image and to permit the engagement of said film with said perforation engaging means for effecting the intermittent movement of said film past said optical means in one direction with respect to said casing while one of said projecting elements is engaged by said rotary element for effecting the take-up of said film in that direction, and in another position, to bring a different transversely restricted longitudinal portion of said film into the field of said image and to permit the engagement of said film with said perforation engaging means in a different sense for effecting the intermittent movement of said film past said optical means in a different direction with respect to said casing while a different one of said projecting elements is engaged by said rotary element for effecting the take-up of said film in said different direction.

8. Film apparatus in accordance with claim 6 in which said magazine is provided with plural apertures, and film guide means for holding said film adjacent said apertures for cooperation with said optical system and said perforation engaging means in said different positions of said magazine to expose transversely different longitudinal portions of said film in said reversible feeding and exposure process.

GORDON BROWN SCHEIBELL.